(12) United States Patent
Huang

(10) Patent No.: US 11,530,873 B2
(45) Date of Patent: Dec. 20, 2022

(54) NOODLE DRIVING APPARATUS

(71) Applicant: A-SHA REPUBLIC INC., Taipei (TW)

(72) Inventor: Jui-Yen Huang, Taipei (TW)

(73) Assignee: A-SHA REPUBLIC INC., Taipei (TW)

( * ) Notice: Subject to any disclaimer, the term of this patent is extended or adjusted under 35 U.S.C. 154(b) by 452 days.

(21) Appl. No.: 16/865,434

(22) Filed: May 4, 2020

(65) Prior Publication Data

US 2021/0337812 A1 Nov. 4, 2021

(51) Int. Cl.
*F26B 21/00* (2006.01)
*A23L 7/109* (2016.01)
*F26B 23/00* (2006.01)
*F26B 9/06* (2006.01)

(52) U.S. Cl.
CPC ............ *F26B 21/002* (2013.01); *A23L 7/109* (2016.08); *F26B 9/066* (2013.01); *F26B 23/002* (2013.01); *F26B 2210/06* (2013.01)

(58) Field of Classification Search
CPC .. F26B 21/002; F26B 21/005; F26B 2210/06; F26B 3/04; F26B 23/001; F26B 23/002; F26B 9/066; A21C 9/02; A23L 3/40; A23L 7/109; A23V 2002/00; Y02P 70/10
See application file for complete search history.

(56) References Cited

U.S. PATENT DOCUMENTS

2006/0168842 A1* 8/2006 Sprague ............... F26B 23/002
34/396

FOREIGN PATENT DOCUMENTS

| CN | 1608475 B | * | 11/2010 | ............ A47F 3/001 |
| CN | 109520228 A | * | 3/2019 | |

* cited by examiner

*Primary Examiner* — Jessica Yuen
(74) *Attorney, Agent, or Firm* — Leong C. Lei

(57) ABSTRACT

The noodle driving apparatus includes an enclosure having a lateral partition separating the enclosure into an upper chamber and a lower chamber. At least one first cool-air provision device and at least one warm-air recovery device are disposed to a side inside the upper chamber. A number of first cool-air inlets and warm-air inlets are configured on the partition toward another side of the upper chamber. Noodles to be dried are placed in the lower chamber. Cool air produced by the first cool-air provision device is introduced into the lower chamber through the first cool-air inlets to absorb moisture from the noodles. Warm air produced from the first cool-air provision device is collected by the warm-air recovery device and introduced into the lower chamber through the warm-air inlets to dry the noodles. The noodle driving apparatus thereby achieves improved drying performance, enhanced energy consumption, and better drying quality.

5 Claims, 5 Drawing Sheets

NOODLE DRIVING APPARATUS

BACKGROUND OF THE INVENTION

(a) Technical Field of the Invention

The present invention is generally related to noodle driving apparatus, and more particular to a noodle driving apparatus of improved drying performance, enhanced energy consumption, and better drying quality.

(b) Description of the Prior Art

Noodles are a popular type of food as there are various varieties and may be prepared in different flavors. Noodles are usually made from grounded wheat and dried noodles, due to their extremely low moisture content, may be kept for a long period of time.

Raw noodles with about 35% moisture content are processed to become dried noodles with 14-15% moisture content. Conventional drying blows air to raw noodles housed in an enclosure, where the air absorbs moisture in the noodles. The moisture-rich air is then guided to an evaporator to remove the moisture. The resulted dry air is then recycled into the enclosure again. The air is as such continuously and repeatedly utilized. However, using evaporator to remove moisture is of inferior performance, thereby taking a longer processing time and lacking environmental friendliness.

SUMMARY OF THE INVENTION

A major objective of the present invention is to provide a noodle driving apparatus capable of achieving improved drying performance, enhanced energy consumption, and better drying quality.

The noodle driving apparatus includes an enclosure having a lateral partition separating an internal space of the enclosure into an upper chamber and a lower chamber beneath the upper chamber. At least one first cool-air provision device and at least one warm-air recovery device are disposed to a side inside the upper chamber. A number of first cool-air inlets and a number of warm-air inlets are configured on the partition toward another side of the upper chamber oppositely to the at least one first cool-air provision device and the at least one warm-air recovery device. Noodles to be dried are placed in the lower chamber. Cool air produced by the at least one first cool-air provision device is introduced into the lower chamber through the first cool-air inlets to absorb moisture from the noodles. Warm air produced from the operation of the at least one first cool-air provision device is collected by the at least one warm-air recovery device and introduced into the lower chamber through the warm-air inlets to dry the noodles. The noodle driving apparatus thereby achieves improved drying performance, enhanced energy consumption, and better drying quality.

Each first cool-air provision device is respectively connected to one or more first cool-air inlets through a pipe, and each warm-air recovery device is respectively connected to one or more warm-air inlets through a pipe.

A number of fans are configured at appropriate intervals within each pipe connecting a warm-air recovery device and a warm-air inlet to facilitate the flow of warm air.

The first cool-air inlets and the warm-air inlets are preferably configured within a half lateral portion of the upper chamber.

The at least one first cool-air provision device and the at least one warm-air recovery device are preferably disposed to another side opposite to the first cool-air inlets and the warm-air inlets within one quarter or one fifth lateral portion of the upper chamber.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
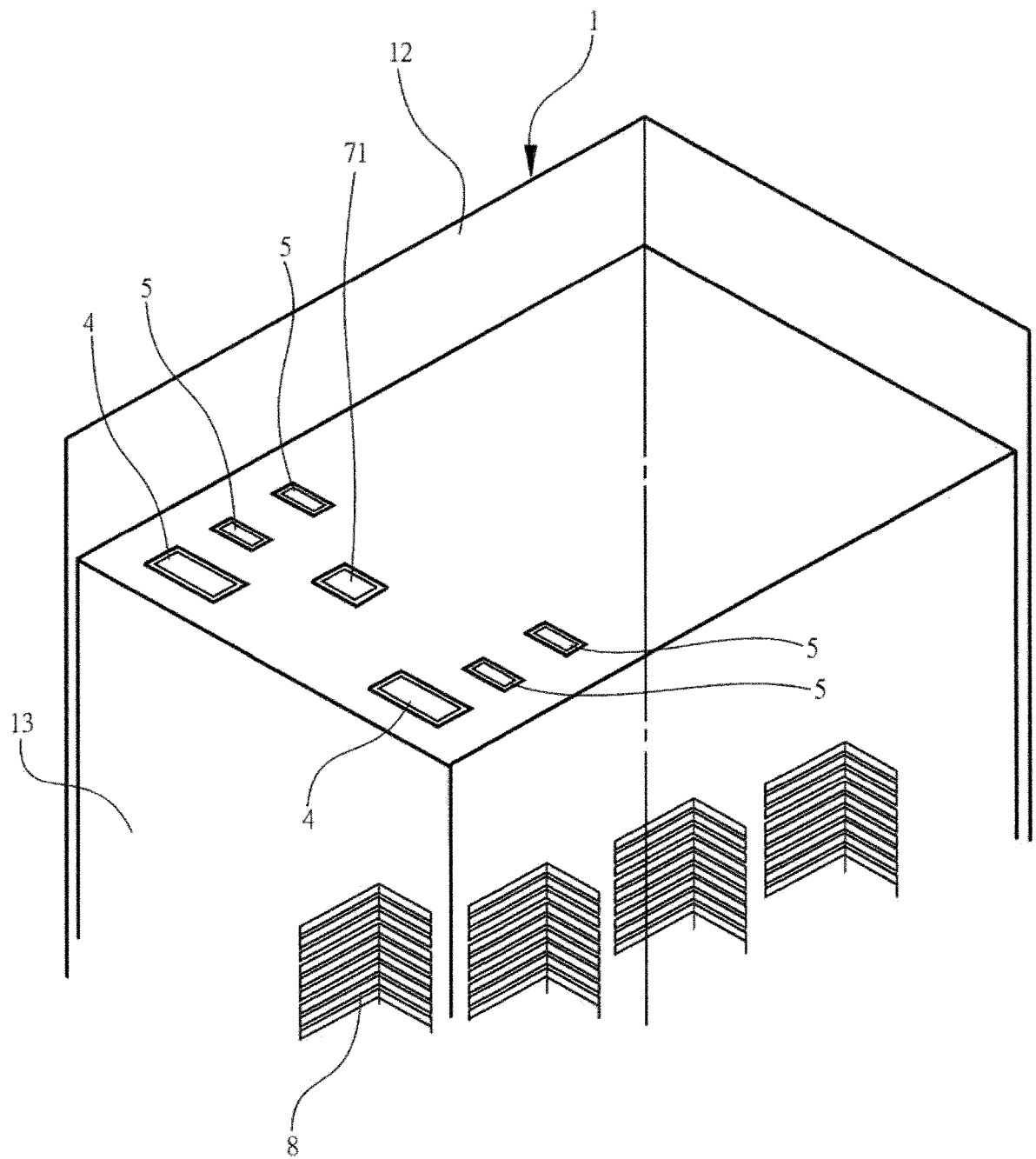
FIG. 1 is a perspective diagram showing a noodle drying apparatus according to an embodiment of the present invention.
Figure 2:
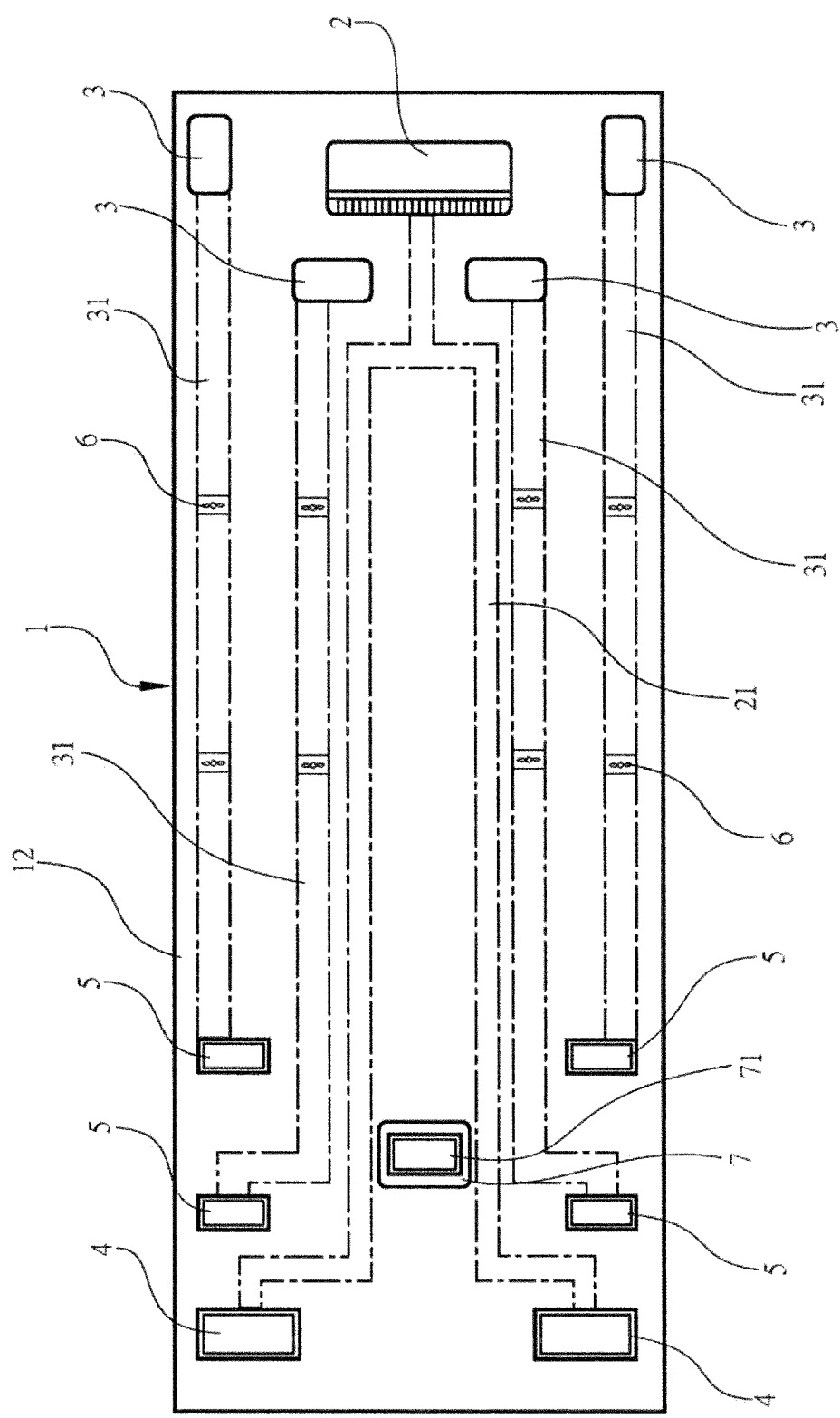
FIG. 2 is a top-view diagram showing the noodle drying apparatus of FIG. 1.

As shown in FIG. 1 and FIG. 2, a noodle drying apparatus according to an embodiment of the present invention includes an enclosure 1. A lateral partition 11 separates an internal space of the enclosure 1 into an upper chamber 12 and a lower chamber 13 beneath the upper chamber 11. At least one first cool-air provision device 2 and at least one warm-air recovery device 3 are provided to a side inside the upper chamber 12.

Toward another side of the upper chamber 12 oppositely to the first cool-air provision device 2, a number of first cool-air inlets 4 are configured on the partition 11. Each first cool-air provision device 2 is respectively connected to one or more first cool-air inlets 4 through pipes 21.

Toward another side of the upper chamber 12 oppositely to the warm-air recovery devices 3, a number of warm-air inlets 5 are configured on the partition 11. Each warm-air recovery device 3 is respectively connected to one or more warm-air inlets 5 through pipes 31. In the present embodiment, a number of fans 6 are configured at appropriate intervals inside each pipe 31.

In the present embodiment, a second cool-air provision device 7 is provided among the first cool-air inlets 4 and warm-air inlets 5, and it is connected a second cool-air inlet 71 configured on the partition 11.

Figure 3:
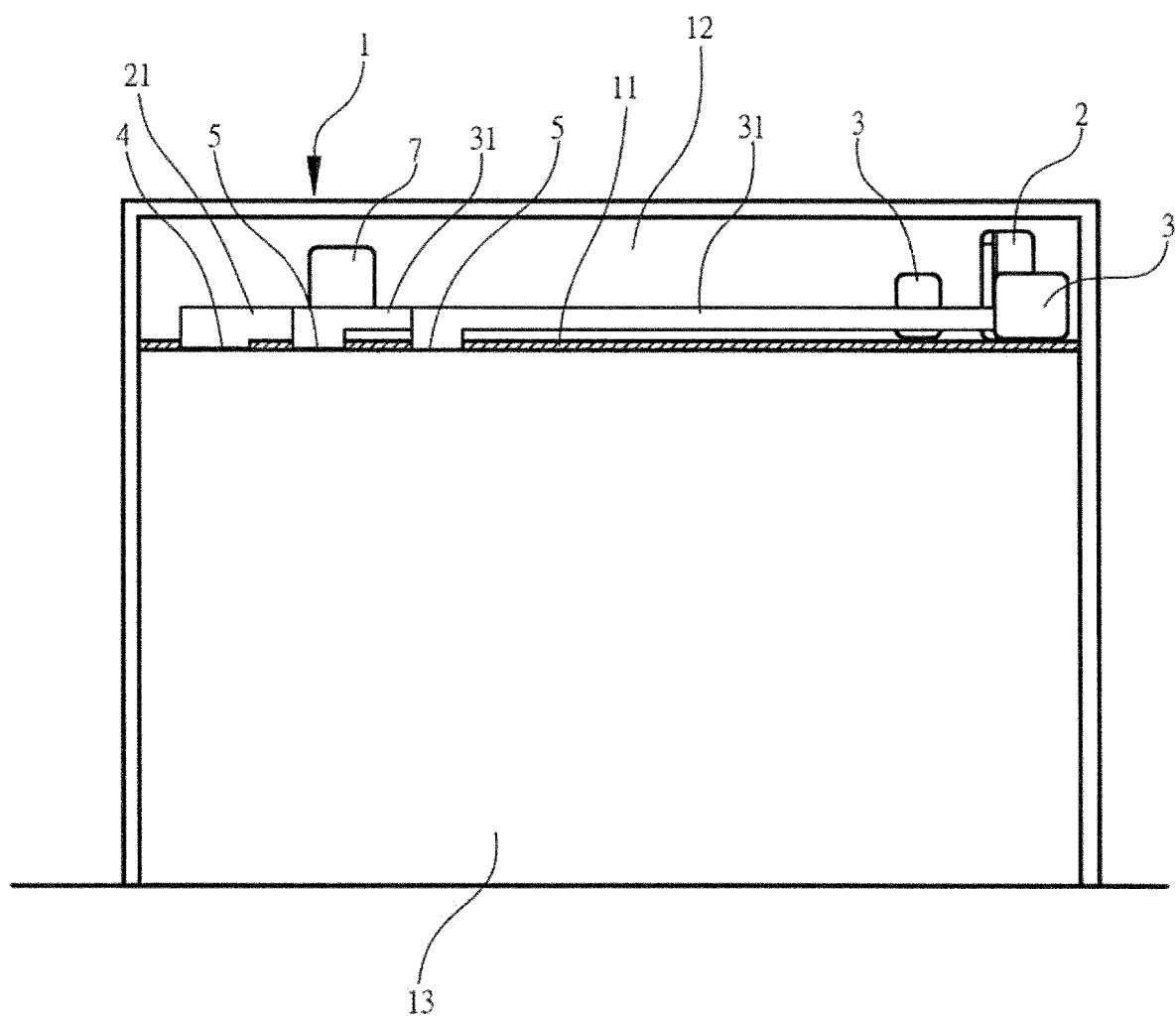
FIG. 3 is a sectional diagram showing the noodle drying apparatus of FIG. 1.

The above described noodle driving apparatus is operated as follows. The noodles to be dried is laid on racks 8, and the racks 8 are placed inside the lower chamber 13 within the enclosure 1. The moisture of the noodles is first absorbed by the cool air produced by the first cool-air provision device 2 and introduced through the first cool-air inlets 4. The warm air produced from the first cool-air provision device 2 is recovered by the warm-air recovery devices 3 and introduced into the lower chamber 13 through the warm-air inlets 5 to further dry the noodles. The drying of noodles is as such achieved with improved drying performance, enhanced energy consumption, and better drying quality As shown in FIGS. 2 and 3, the enclosure 1 is separated by a partition 11 into an upper chamber 12 and a lower chamber 13 beneath the upper chamber 12. Within the upper chamber 12, at least one first cool-air provision device 2 and at least one warm-air recovery device 3 are disposed to a side. To another side of the upper chamber 12, first cool-air inlets 4 and warm-air inlets 5 are configured and respectively connected to the first cool-air provision device 2 and warm-air recovery devices 3. In the present embodiment, the first cool-air inlets 4 and warm-air inlets 5 are preferably configured to be within a half lateral portion of the upper chamber 12. The first cool-air provision device 2 and warm-air recovery devices 3 are preferably disposed to another side opposite to the first cool-air inlets 4 and warm-air inlets 5 within one quarter or one fifth lateral portion of the upper chamber 12.

Figure 4:
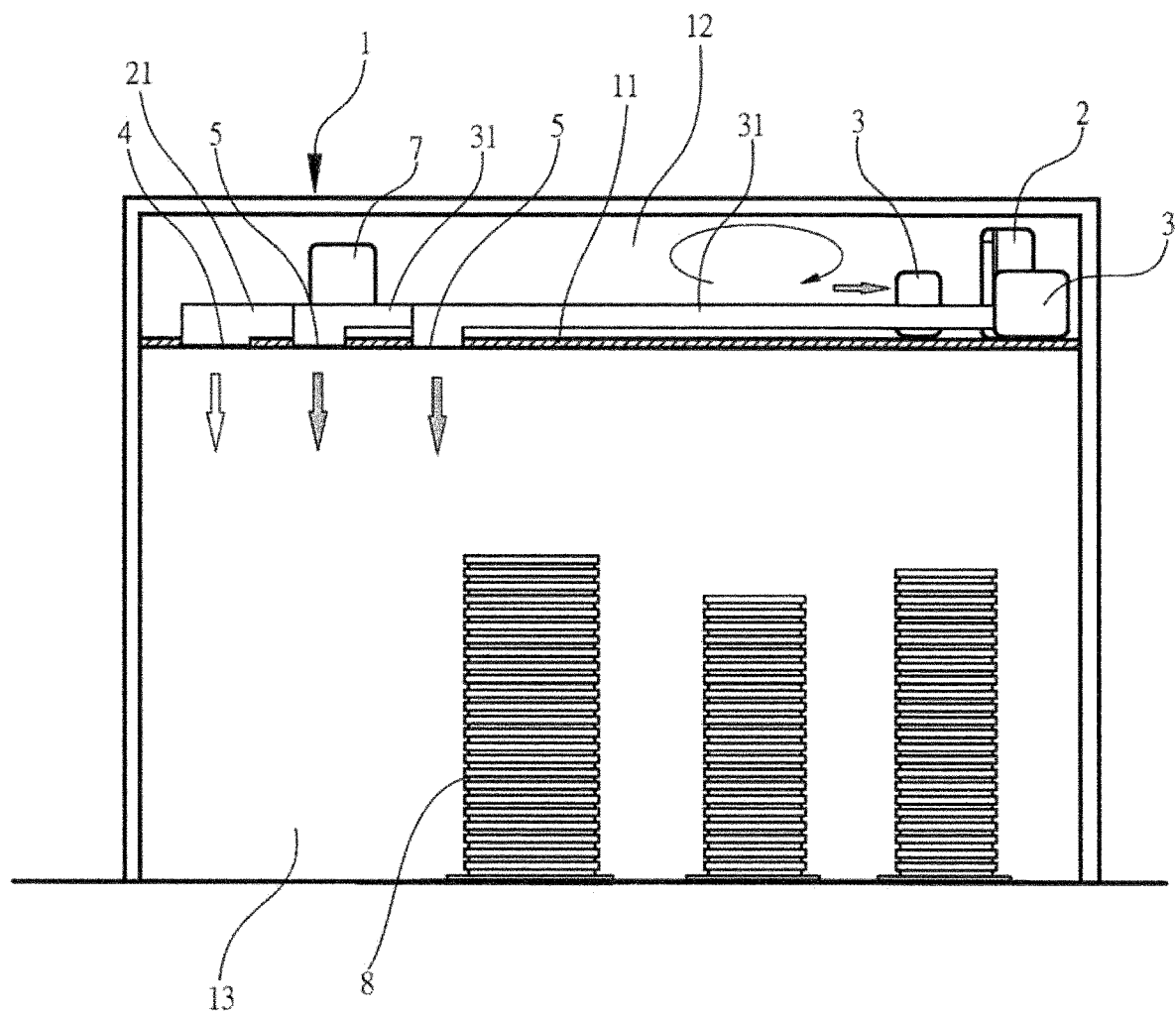
FIG. 4 is a sectional diagram showing an operational scenario of the noodle drying apparatus of FIG. 1.
Figure 5:
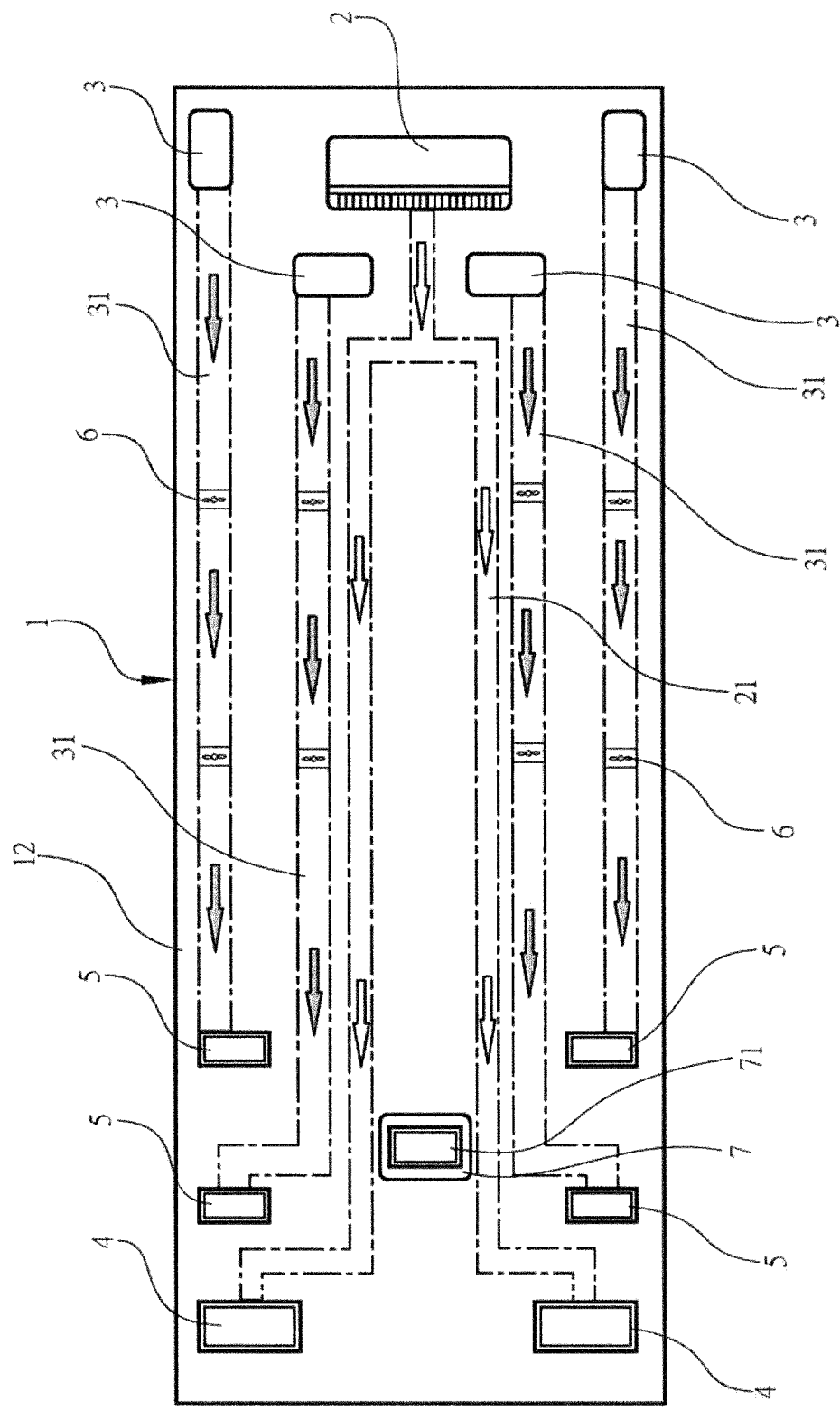
FIG. 5 is another sectional diagram showing an operational scenario of the noodle drying apparatus of FIG. 1.

As shown in FIGS. 4 and 5, the noodles to be dried is laid on racks 8, and the racks 8 are placed inside the lower chamber 13 within the enclosure 1. After turning on the first cool-air provision device 2 and second cool-air provision device 7, the residual moisture of the noodles is absorbed by the cool air produced by the first cool-air provision device 2 and second cool-air provision device 7 introduced through the first cool-air inlets 4 and second cool-air inlets 71.

The warm air resulted from the operation of the first cool-air provision device 2 and second cool-air provision device 7 is dispersed within a portion of the upper chamber 12, and is collected by the warm-air recovery devices 3. The warm air is then introduced into the lower chamber 13 through the warm-air inlets 5 to further dry the noodles within the lower chamber 13. Within the pipes 31 that connect the warm-air recovery devices 3 and warm-air inlets 5, a number of fans 6 are configured at appropriate intervals so as to facilitate the flow of warm air.

As described above, the noodle drying apparatus of the present invention, through recycling the warm air resulted from the operation of cool-air provision devices, achieves significantly enhanced drying performance and quality with reduced energy consumption.

While certain novel features of this invention have been shown and described and are pointed out in the annexed claim, it is not intended to be limited to the details above, since it will be understood that various omissions, modifications, substitutions and changes in the forms and details of the apparatus illustrated and in its operation can be made by those skilled in the art without departing in any way from the claims of the present invention.

I claim:

1. A noodle driving apparatus, comprising:
   an enclosure having a lateral partition separating an internal space of the enclosure into an upper chamber and a lower chamber beneath the upper chamber;
   at least one first cool-air provision device and at least one warm-air recovery device disposed to a side inside the upper chamber; and
   a plurality of first cool-air inlets and a plurality of warm-air inlets configured on the partition toward another side of the upper chamber oppositely to the at least one first cool-air provision device and the at least one warm-air recovery device;
   wherein each first cool-air provision device is respectively connected to one or more first cool-air inlets;
   each warm-air recovery device is respectively connected to one or more warm-air inlets;
   noodles to be dried are placed in the lower chamber;
   cool air produced by the at least one first cool-air provision device is introduced into the lower chamber through the first cool-air inlets to absorb moisture from the noodles;
   warm air produced from the operation of the at least one first cool-air provision device is collected by the at least one warm-air recovery device and introduced into the lower chamber through the warm-air inlets to dry the noodles.

2. The noodle drying apparatus according to claim 1, wherein the first cool-air inlets and the warm-air inlets are configured within a half lateral portion of the upper chamber.

3. The noodle drying apparatus according to claim 1, wherein the at least one first cool-air provision device and the at least one warm-air recovery device are disposed to another side opposite to the first cool-air inlets and the warm-air inlets within one quarter or one fifth lateral portion of the upper chamber.

4. The noodle drying apparatus according to claim 1, wherein the at least one cool-air provision device is respectively connected to the cool-air inlets through a pipe; and the at least one warm-air recovery device is respectively connected to the warm-air inlets through a pipe.

5. The noodle drying apparatus according to claim 4, wherein a plurality of fans are configured at appropriate intervals within each pipe connecting a warm-air recovery device and a warm-air inlet to facilitate the flow of warm air.

* * * * *